United States Patent
Pesek et al.

(10) Patent No.: US 7,960,017 B2
(45) Date of Patent: Jun. 14, 2011

(54) MIXED ION IONOMERIC SHEETS AND HIGH STRENGTH LAMINATES PRODUCED THEREFROM

(75) Inventors: Steven C. Pesek, Orange, TX (US); Sam Louis Samuels, Landenberg, PA (US); Charles Anthony Smith, Vienna, WV (US); Stephen J. Bennison, Wilmington, DE (US); Richard Allen Hayes, Beaumont, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 692 days.

(21) Appl. No.: 11/584,988

(22) Filed: Oct. 23, 2006

(65) Prior Publication Data

US 2007/0092706 A1    Apr. 26, 2007

Related U.S. Application Data

(60) Provisional application No. 60/729,259, filed on Oct. 21, 2005.

(51) Int. Cl.
*B32B 27/32* (2006.01)
*B32B 27/36* (2006.01)
*B32B 27/30* (2006.01)
*B32B 17/06* (2006.01)

(52) U.S. Cl. ........ 428/220; 428/500; 428/412; 428/522; 428/523; 428/426

(58) Field of Classification Search .................. 428/220, 428/500, 412, 522, 523, 426
See application file for complete search history.

(56) References Cited

U.S. PATENT DOCUMENTS

| | | | | |
|---|---|---|---|---|
| 3,404,134 | A | * | 10/1968 | Rees ............................ 525/362 |
| 4,663,228 | A | * | 5/1987 | Bolton et al. ................. 428/334 |
| 4,668,574 | A | | 5/1987 | Bolton et al. |
| 4,911,451 | A | | 3/1990 | Sullivan et al. |
| 4,990,574 | A | | 2/1991 | Yamada |
| 5,753,767 | A | | 5/1998 | Ward |
| 5,763,062 | A | | 6/1998 | Smith et al. |
| 5,848,943 | A | | 12/1998 | Sano et al. |
| 6,114,046 | A | | 9/2000 | Hanoka |
| 6,187,448 | B1 | | 2/2001 | Hanoka et al. |
| 6,320,116 | B1 | | 11/2001 | Hanoka |
| 6,353,042 | B1 | | 3/2002 | Hanoka et al. |
| 6,432,522 | B1 | | 8/2002 | Friedman et al. |
| 2002/0016222 | A1 | | 2/2002 | Sullivan |

OTHER PUBLICATIONS

PCT International Search Report for international Application No. PCT/US2006/041091 dated Mar. 29, 2007.

* cited by examiner

*Primary Examiner* — David R Sample
*Assistant Examiner* — Tahseen Khan

(57) ABSTRACT

The invention describes a polymeric sheet that has at least one layer that comprises an ionomer or ionomer blend that incorporates a partially neutralized alpha, beta-ethylenically unsaturated carboxylic acid component and is useful in glass laminate applications. The ionomer or ionomer blend contains one or more monovalent metal ions in an amount ranging from about 1 to about 60%, preferably about 10 to about 55%, and more preferably about 15 to about 50%, and one or more polyvalent metal ions in an amount ranging from about 40 to about 99%, preferably about 45 to about 90%, and more preferably about 50 to about 85%. This ratio range of monovalent and polyvalent metal neutralization ions provides synergistically greater adhesion to glass than found for either the monovalent or the polyvalent metal neutralization ions alone.

11 Claims, No Drawings

US 7,960,017 B2

MIXED ION IONOMERIC SHEETS AND HIGH STRENGTH LAMINATES PRODUCED THEREFROM

This application claims the benefit of U.S. Provisional Application No. 60/729,259, filed Oct. 21, 2005, which is incorporated by reference herein for all purposes as if fully set forth.

BACKGROUND OF THE INVENTION

1. Field of the Invention

This invention relates generally to the field of safety or "threat resistant" laminated glass products and polymeric interlayers used therein. This invention specifically relates to a polymeric sheet comprising specific mixed ion ionomers or ionomer blends, especially useful in high-strength laminates.

2. Description of Related Art

Glass laminated products have contributed to society for almost a century. Beyond the well known, every day automotive safety glass used in windshields, laminated glass is used in all forms of the transportation industry. It is utilized as windows for trains, airplanes, ships, and nearly every other mode of transportation. Safety glass is characterized by high impact and penetration resistance and does not scatter glass shards and debris when shattered.

Safety glass typically consists of a sandwich of two glass sheets or panels bonded together with an interlayer of a polymeric film or sheet, which is placed between the two glass sheets. One or both of the glass sheets may be replaced with optically clear rigid polymeric sheets, such as sheets of polycarbonate materials. Safety glass has further evolved to include multiple layers of glass and polymeric sheets bonded together with interlayers of polymeric films or sheets.

The interlayer is typically made with a relatively thick polymer film or sheet, which exhibits toughness and bondability to provide adhesion to the glass in the event of a crack or crash. Over the years, a wide variety of polymeric interlayers have been developed to produce laminated products. In general, these polymeric interlayers must possess a combination of characteristics including very high optical clarity (low haze), high impact resistance, high penetration resistance, excellent ultraviolet light resistance, good long term thermal stability, excellent adhesion to glass and other rigid polymeric sheets, low ultraviolet light transmittance, low moisture absorption, high moisture resistance, excellent long term weatherability, among other requirements. Widely used interlayer materials include complex multi-component compositions comprising polymers such as polyvinylbutyral (PVB), polyurethane (PU), polyvinylchloride (PVC), metallocene-catalyzed linear low density polyethylenes, ethylene vinyl acetate (EVAc), ethylene acid copolymer ionomers, polymeric fatty acid polyamides, polyester resins such as poly (ethylene terephthalate), silicone elastomers, epoxy resins and elastomeric polycarbonates.

A more recent trend has been the use of glass laminated products in the construction business for homes and office structures. The use of architectural glass has expanded rapidly over the years as designers incorporated more glass surfaces into buildings. "Threat resistance" has become an ever increasing requirement for architectural glass laminated products. These newer products are designed to resist both natural and man made disasters. Examples of these needs include the recent developments of hurricane resistant glass, now mandated in hurricane susceptible areas, theft resistant glazings, and the more recent blast resistant glass laminated products designed to protect buildings and their occupants. These products have great enough strength to resist intrusion even after the frangible portion of the glass laminate has been broken, for example, by high force winds, by impact of flying debris or by a criminal attempting to break into a vehicle or structure.

In addition, glass laminated products have now reached the strength requirements for being incorporated as structural elements within buildings. An example of this would be glass staircases now being featured in many buildings.

A part of this trend has been the use of copolyethylene ionomer resins as the glass laminate interlayer material. Such ionomer resins offer significantly higher strength then found for the other common interlayer materials, such as polyvinyl butyral and ethylene vinyl acetate materials. For example, Friedman, et. al., in U.S. Pat. No. 6,432,522, disclose that polyvinyl butyral resins have a modulus (ASTM Method D638) of less than 5000 psi (34.5 MPa), and ethylene vinyl acetate materials have a modulus of 750-900 psi (5.2-6.2 MPa), while the copolyethylene ionomer resins have a modulus in the range of 34,000-80,000 psi (235-552 MPa).

The use of certain mixed metal ion-neutralized ionomeric material within glass laminates has been disclosed within the art. For example, Bolton, et. al., in U.S. Pat. No. 4,663,228 and U.S. Pat. No. 4,668,574, disclose a transparent laminated article which includes a water insoluble ionomer resin film comprising the metal salt of an ionomer resin prepared from ethylene and methacrylic acid monomers and, optionally, further partially neutralized by an organic diamine or triamine. They specify that a mixture of sodium and zinc ionomer resins may be used, and that both zinc and sodium ions may be used to neutralize the ionomer.

Smith, et. al., in U.S. Pat. No. 5,763,062, disclose a transparent article comprising an extruded ionomer resin film or sheet having a carboxylic acid content of between about 17 and 40 weight percent, the ionomer resin being essentially free of amines and having a thickness of at least about 0.5 mm. They disclose that "[s]uitable metal cations for neutralization are monovalent cations such as lithium, sodium, and potassium. Divalent cations such as magnesium, calcium, and zinc may also be used, alone or in combination with the monovalent cations, but often the metal carbonate or oxide is present as a haze producing impurity." (U.S. Pat. No. 5,763,062, Column 6, line 1). They exemplify laminates which include sodium and sodium and lithium mixtures of metal neutralization agents.

Hanoka, in U.S. Pat. No. 6,114,046, and Hanoka, et. al., in U.S. Pat. No. 6,187,448 and U.S. Pat. No. 6,353,042, disclose photovoltaic solar cell modules and glass laminates which includes a layer of metallocene polyethylene disposed between two layers of a certain ionomers as an encapsulant material. Preferred ionomers include partially neutralized ethylene-methacrylic acid copolymers or ethylene-acrylic acid copolymers. They disclose that "the backskin layer 28 can be a thermoplastic polyolefin comprising a mixture of at least two acid copolymers such as a sodium acid copolymer and a zinc acid copolymer" (U.S. Pat. No. 6,187,448, column 6, lines 52-53). However, they further disclose that "The ionomer layers are thin (i.e., the order of 0.001-0.004 [inch] thick)" (U.S. Pat. No. 6,114,046, Column 2, line 66) and "The acid copolymer layers 14, 16, can have a thickness in the range of 0.001-0.004 inch" (1-4 mils) (U.S. Pat. No. 6,187, 448, column 6, line 19). Hanoka, in U.S. Pat. No. 6,320,116, discloses solar cell modules which may include ionomer encapsulants which have been exposed to electron beam radiation. He discloses that "One example of a mixture of polyolefins is a mixture of Zn and Na ionomers along with a mineral filler." (U.S. Pat. No. 6,320,116, column 6, line 8).

The high strength laminates of the present invention overcome the shortcomings disclosed within the art and provide durable glass laminates which additionally provide synergistically improved glass adhesion.

BRIEF SUMMARY OF THE INVENTION

The invention herein provides a polymeric sheet having a thickness of 10 mils (0.25 mm) or greater and having at least one layer comprising an ionomer or ionomer blend. The ionomer or ionomer blend comprises ions of one or more monovalent metals in an amount ranging from about 1 to about 60%, preferably about 10 to about 55%, more preferably about 15 to about 50%, and ions of one or more polyvalent metals in an amount ranging from about 40 to about 99%, preferably about 45 to about 90%, more preferably about 50 to about 85%, wherein the percentages are based on the total amount of neutralization.

This invention also provides a laminate comprising a polymeric sheet as described above and at least one additional layer. Additional layers can be rigid sheets, polymeric sheets including polymeric sheets of the invention as described above, polymeric films and combinations thereof.

In one embodiment the invention provides a laminated article comprising:

(a) a polymeric sheet having a thickness of 10 mils (0.25 mm) or greater and having at least one layer comprising an ionomer or ionomer blend, wherein the ionomer or ionomer blend comprises ions of one or more monovalent metals in an amount ranging from about 1 to about 60%, preferably about 10 to about 55%, more preferably about 15 to about 50%, and ions of one or more polyvalent metals in an amount ranging from about 40 to about 99%, preferably about 45 to about 90%, more preferably about 50 to about 85%, wherein the percentages are based on the total amount of neutralization; and (b) a rigid sheet laminated to the surface of one side of the polymeric sheet, wherein the rigid sheet is selected from the group consisting of glass, polycarbonate, poly(meth)acrylate, cyclic polyolefins, polystyrene and combinations thereof.

In another embodiment the laminated article further comprises an additional rigid sheet laminated to the other surface of the polymeric sheet.

In still another embodiment the laminated article further comprises at least one additional layer selected from the group consisting of rigid sheets, polymeric sheets including polymeric sheets of the invention as described above, polymeric films and combinations thereof. The additional polymeric sheets or films are preferably selected from the group consisting of: solar control films, sheet or films comprising oriented or unoriented polyester, polycarbonate, polyurethane compositions, polyvinyl chloride composition, polyvinyl butyral compositions, acoustic polyvinyl acetal compositions, ethylene vinyl acetate compositions, ionomers and combinations thereof.

DETAILED DESCRIPTION OF THE INVENTION

Definitions

The term "copolymer" means a polymer polymerized from two or more monomers, and thereby includes terpolymers, or more precisely, a polymer containing two or more repeat units.

The term "ionomer" is defined herein as a copolymer of an alpha olefin and an alpha, beta-ethylenically unsaturated carboxylic acid partially neutralized with ions of at least one monovalent metal and with ions of at least one polyvalent metal. The copolymer of an alpha olefin and an alpha, beta-ethylenically unsaturated carboxylic acid preferably incorporates from about 0.1 to about 30 weight percent of the alpha, beta-ethylenically unsaturated carboxylic acid component. The copolymer preferably incorporates from about 10 to about 30 weight percent of the alpha, beta-ethylenically unsaturated carboxylic acid component and more preferably incorporates from about 21 to about 30 weight percent of the alpha, beta-ethylenically unsaturated carboxylic acid component. The alpha olefin preferably incorporates from 2 to 10 carbon atoms. Preferably, the alpha olefin is selected from the group consisting of ethylene, propylene, 1-butene, 1-pentene, 1-hexene, 1-heptene, 3-methyl-1-butene, 4-methyl-1-pentene, and the like and mixtures thereof. More preferably, the alpha olefin is ethylene. Preferably, the alpha, beta-ethylenically unsaturated carboxylic acid component is selected from the group consisting of acrylic acid, methacrylic acid, itaconic acid, maleic acid, maleic anhydride, fumaric acid, monomethyl maleic acid, and mixtures thereof. More preferably, the alpha, beta-ethylenically unsaturated carboxylic acid component is selected from the group consisting of acrylic acid, methacrylic acid, and mixtures thereof.

The copolymers may optionally contain other unsaturated comonomers. Other unsaturated comonomers are preferably selected from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol) acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimenthyl fumarate, vinyl acetate, vinyl propionate, and the like and mixtures thereof. More preferably, the other unsaturated comonomers are selected from the group consisting of methyl acrylate, methyl methacrylate, butyl acrylate, butyl methacrylate, glycidyl methacrylate, vinyl acetate, and mixtures thereof. Preferably, the ethylene copolymers of the present invention incorporate between about 0 and about 50 weight percent of the other unsaturated comonomer, based on the total weight of the composition. More preferably, the ethylene copolymers of the present invention incorporate between about 0 and about 25 weight percent, and most preferably between about 0 weight percent and about 10 weight percent of the other unsaturated comonomer, based on the total weight of the composition. The ethylene copolymers of the present invention may be polymerized as disclosed, for example, in U.S. Pat. No. 3,264,272, U.S. Pat. No. 3,355,319, U.S. Pat. No. 3,404,134, U.S. Pat. No. 3,520,861, U.S. Pat. No. 4,248,990, U.S. Pat. No. 5,028,674, U.S. Pat. No. 5,057,593, U.S. Pat. No. 5,827,559, U.S. Pat. No. 6,500,888 and U.S. Pat. No. 6,518,365.

About 5 to about 100 percent of the carboxylic acid functions incorporated within the copolymer are neutralized with certain mixtures of monovalent and polyvalent metal ions. Preferably, about 10 to about 90 percent of the carboxylic acid functions are neutralized. More preferably, about 20 to about 50 percent of the carboxylic acid functions are neutralized.

The term "ionomer blend" is defined herein as at least one copolymer of an alpha olefin and an alpha, beta-ethylenically unsaturated carboxylic acid neutralized with ions of at least one monovalent metal and at least one copolymer of an alpha olefin and an alpha, beta-ethylenically unsaturated carboxylic acid neutralized with ions of at least one polyvalent metal. Preferably each of the copolymers of an alpha olefin and an alpha, beta-ethylenically unsaturated carboxylic acid independently incorporates from about 0.1 to about 30 weight percent of the alpha, beta-ethylenically unsaturated carboxylic acid component. Each copolymer preferably incorporates from about 10 to about 30 weight percent of the alpha, beta-ethylenically unsaturated carboxylic acid component and more preferably incorporates from about 21 to about 30 weight percent of the alpha, beta-ethylenically unsaturated carboxylic acid component. Preferably, the alpha, beta-ethylenically unsaturated carboxylic acid component is selected from the group consisting of acrylic acid, methacrylic acid, and mixtures thereof. The ethylene copolymers may optionally independently contain other unsaturated comonomers. About 5 to about 100 percent of the carboxylic acid functions incorporated within each of the copolymers are neutralized. Preferably, about 10 to about 90 percent of the carboxylic acid functions are neutralized. More preferably, about 20 to about 50 percent of the carboxylic acid functions are neutralized.

The term "poly(meth)acrylates" is used to have its common meaning of polyacrylates and polymethacrylates, or mixtures or blends thereof.

Polymeric Sheets

The present invention provides for a polymeric sheet having a thickness of 10 mils (0.25 mm) or greater, and having at least one layer comprising an ionomer or ionomer blend. The ionomer or ionomer blend must comprise ions of one or more monovalent metals and ions of one or more polyvalent metals.

The polymeric sheet of the present invention has a thickness of about 10 mils (0.25 mm) or greater. Preferably, the polymeric sheet of the present invention has a thickness of about 15 mils (0.38 mm) or greater, based on enhanced penetration strength of the laminates produced therefrom. More preferably, the polymeric sheet has a thickness of about 30 mils (0.75 mm) or greater, based on further enhanced penetration strength of the laminates produced therefrom. Even more preferably, the polymeric sheet has a thickness of about 50 mils (1.25 mm) or greater, based on even further enhanced penetration strength of the laminates produced therefrom. The enhanced penetration strength is necessary to satisfy many of the current mandated requirements for hurricane and threat resistance. Many end uses in the current environment require the ethylene copolymer interlayer to be even thicker. Interlayers thicker than 60 mils (1.50 mm), 90 mils (2.25 mm), and even thicker than 120 mils (3.00 mm), are becoming commonplace within the marketplace. Preferably, the polymeric sheets incorporate rough surfaces to facilitate the deairing during lamination processes.

The level of ions of monovalent metals in the ionomer or the ionomer blend is from about 1 to about 60 percent of the total amount of neutralization and the level of ions of polyvalent metals is from about 40 to about 99 percent of the total amount of neutralization. Preferably, the level of ions of monovalent metals is from about 1 to about 50 percent of the total amount of neutralization and the level of ions of polyvalent metals is from about 50 to about 99 percent of the total amount of neutralization. This ratio range of monovalent and polyvalent metal neutralization ions provides synergistically greater adhesion to glass than found for either the monovalent or the polyvalent metal neutralization ions alone.

Preferable monovalent metals are selected from the group consisting of sodium, potassium, lithium, silver, mercury, copper, and mixtures thereof. More preferably, the monovalent metal is sodium. The polyvalent metals may be divalent, trivalent, tetravalent, multivalent or mixtures thereof. Preferable divalent metals are selected from the group consisting of beryllium, magnesium, calcium, strontium, barium, copper, cadmium, mercury, tin, lead, iron, cobalt, nickel, zinc, and mixtures thereof. Preferable trivalent metals are selected from the group consisting of aluminum, scandium, iron, yttrium, and mixtures thereof. Preferable multivalent metals are selected from the group consisting of titanium, zirconium, hafnium, vanadium, tantalum, tungsten, chromium, cerium, iron, and mixtures thereof. More preferably, the polyvalent metal is zinc. The ethylene copolymers of the present invention may be neutralized as disclosed, for example, in U.S. Pat. No. 3,404,134, U.S. Pat. No. 4,666,988, U.S. Pat. No. 4,774,290, and U.S. Pat. No. 4,847,164.

The polymeric sheets, as described and claimed herein, are preferably transparent. As such they are especially useful in glass laminate applications, specifically as an interlayer for safety or "threat resistant" glass lamination products.

The process to produce the blends of the present invention can be performed by any high shear, intensive melt mixing process known in the art. Preferably, such a process would involve intensive mixing of the molten ethylene copolymer resins and other optional components. For example, the intensive mixing may be provided through static mixers, rubber mills, Brabender mixers, Buss kneaders, single screw extruders or twin screw extruders. The ethylene copolymer resins can be dried prior to any mixing step. The ethylene copolymer resins can be mixed with the other optional components as a dry blend, typically referred to as a "pellet blend". Alternatively, the ethylene copolymer resins can be cofed through two different feeders. In an extrusion process, the ethylene copolymer resins would typically be fed into the back, feed section of the extruder. However, the ethylene copolymer resins independently can be advantageously fed into two different locations of the extruder. For example, the ethylene copolymer resin neutralized with the monovalent metal ions can be added in the back, feed section of the extruder while the ethylene copolymer resin neutralized with the polyvalent metal ions is fed in the front of the extruder near the die plate. The extruder temperature profile is set up to allow the ethylene copolymer resins to melt under the processing conditions. The screw design will also provide stress and, in turn, heat, to the resins as it mixes the molten ethylene copolymer resins. Generally, the ethylene copolymer resins melt processing temperature will be within the range of about 50° C. to about 300° C. However, the exact processing conditions will depend on the chemical composition of the ethylene copolymer resins. Alternatively, the ethylene copolymers can be blended as a part of the sheet process, as described below. Preferably, for final sheet clarity, the ethylene copolymer resins chosen in the production of the blend of the ethylene copolymer resins are miscible.

As one skilled in the art would appreciate, when the ethylene copolymer resins which are utilized to produce the blends of the present invention are compositionally equivalent—with exception of the neutralization metal ion type and level—the homogenous compositions of the present invention are produced as described above for the blends of the present invention.

Laminates

A further aspect of the present invention includes high strength multilayer laminates comprising a layer of the polymeric sheet of the present invention and at least one additional layer. Specific preferred embodiments are high strength laminates comprising a layer of the polymeric sheet of the present invention and a layer of a rigid sheet and such high strength laminates further comprising at least one additional layer. The additional layers can be rigid sheets, polymeric sheets or films including polymeric sheets as described above and combinations thereof.

The rigid sheet can be glass or rigid transparent plastic sheets, such as polycarbonate, acrylics, poly(meth)acrylate, cyclic polyolefins, such as ethylene norbornene polymers, polystyrene (preferably metallocene-catalyzed polystyrene) and combinations thereof. Metal or ceramic plates may be substituted for the rigid polymeric sheet or glass if clarity is not required for the laminate.

Preferably, the rigid sheet is glass. The term "glass" is meant to include not only window glass, plate glass, silicate glass, sheet glass, and float glass, but also includes colored glass, and specialty glass with ingredients to control solar heating, coated glass with sputtered metals such as silver or indium tin oxide for solar control purposes, E-glass, Toroglass®, and Solex® glass. Such specialty glasses are disclosed in, for example, U.S. Pat. No. 4,615,989, U.S. Pat. No. 5,173,212, U.S. Pat. No. 5,264,286, U.S. Pat. No. 6,150,028, U.S. Pat. No. 6,340,646, U.S. Pat. No. 6,461,736, and U.S. Pat. No. 6,468,934. The type of glass to be selected for a particular laminate depends on the intended use.

Essentially any polymer may find utility as an additional polymeric film in a laminate of the present invention. Preferably, the polymeric film is transparent. Preferred films for use as polymeric film layers include, without limitation, oriented and unoriented polyester films, polycarbonate films, polyurethane films, and polyvinyl chloride films. Most preferably, the additional film layer is biaxially oriented poly(ethylene terephthalate). Film is made from the polymeric material by any process known in the art. For example, thin films may be formed through dipcoating as taught within U.S. Pat. No. 4,372,311, through compression molding as taught within U.S. Pat. No. 4,427,614, through melt extrusion as taught within U.S. Pat. No. 4,880,592, through melt blowing as taught within U.S. Pat. No. 5,525,281, or other art processes. Preferably the film is formed through extrusion processes. The difference between a film and a sheet is the thickness, but there is no set industry standard as to when a film becomes a sheet. For purposes of this invention, said polymeric film has a thickness of about 10 mils (0.25 millimeters (mm)) or less. Preferably, said polymeric film has a thickness of about 0.5 mils (0.012 mm) to about 10 mils (0.25 mm). More preferably, said polymeric film has a thickness of about 1 mil (0.025 mm) to about 5 mils (0.13 mm).

Multilayer films can also be utilized as the polymeric film. One advantage to multilayer films is that specific properties can be tailored into the film to solve critical use needs while allowing the more costly ingredients to be relegated to the outer layers where they provide the greater needs. The multilayer film structures can be formed through coextrusion, blown film, dipcoating, solution coating, blade, puddle, airknife, printing, Dahlgren, gravure, powder coating, spraying, or other art processes. Typically, the multilayer films are produced through coextrusion processes or lamination processes. The additional layers may serve as barrier layers, adhesive layers, antiblocking layers, or for other purposes.

Regardless of how the film is formed, it may be subjected to orientation by stretching in either the machine or the transverse direction or both after formation. The machine direction stretch is initiated in forming the film simply by rolling out and taking up the film. This inherently stretches the film in the direction of takeup, orienting some of the fibers. Although this strengthens the film in the machine direction, it allows the film to tear easily in the direction at right angles because all of the fibers are oriented in one direction. The biaxially oriented film may further be subjected to additional drawing of the film in the machine direction, in a process known as tensilizing. The film orientation may be obtained by any process known within the art.

Shrinkage can be controlled by holding the film in a stretched position and heating for a few seconds before quenching. This heat stabilizes the oriented film, which then shrinks only at temperatures above the heat stabilization temperature. Further, the film may also be subjected to rolling, calendering, coating, embossing, printing, or any other typical finishing operations known within the art.

The above process conditions and parameters for film making by any method in the art are easily determined by a skilled artisan for any given polymeric composition and desired application.

The film properties may be further adjusted by adding certain additives and fillers to the polymeric composition, such as colorants, dyes, UV and thermal stabilizers, antioxidants, plasticizers, lubricants, antiblock agents, and slip agents.

The films of the present invention can be further modified to provide valuable attributes to the films and to the laminates produced therefrom. The films of the present invention can be treated by radiation, for example E-beam treatment of the films. E-beam treatment of the films of the present invention with an intensity in the range of about 2 MRd to about 20 MRd will provide an increase in the softening point of the film (Vicat Softening Point) of about 20° C. to about 50° C. Preferably, the radiation intensity is from about 2.5 MRd to about 15 MRd.

Preferably, one or both surfaces of the polymeric film are treated to enhance the adhesion. This treatment may take any form known within the art, including adhesives, primers, such as silanes, flame treatments, such as disclosed within U.S. Pat. No. 2,632,921, U.S. Pat. No. 2,648,097, U.S. Pat. No. 2,683,894, and U.S. Pat. No. 2,704,382, plasma treatments, such as disclosed within U.S. Pat. No. 4,732,814, electron beam treatments, oxidation treatments, corona discharge treatments, chemical treatments, chromic acid treatments, hot air treatments, ozone treatments, ultraviolet light treatments, sand blast treatments, solvent treatments, and the like and combinations thereof. For example, a thin layer of carbon may be deposited on one or both surfaces of the polymeric film through vacuum sputtering as disclosed in U.S. Pat. No. 4,865,711. For example, U.S. Pat. No. 5,415,942 discloses a hydroxy-acrylic hydrosol primer coating that may serve as an adhesion-promoting primer for poly(ethylene terephthalate) films. The polymeric film of the present invention may include a primer coating on one or both surfaces, more preferably both surfaces, comprising a coating of a polyallylamine-based primer. The polyallylamine-based primer and its application to a poly(ethylene terephthalate) polymeric film are disclosed within U.S. Pat. No. 5,411,845, U.S. Pat. No. 5,770,312, U.S. Pat. No. 5,690,994, and U.S. Pat. No. 5,698,329.

The polymeric film is preferably sufficiently stress-relieved and shrink-stable under the coating and lamination processes. Preferably, the polymeric film is heat stabilized to provide low shrinkage characteristics when subjected to elevated temperatures (i.e. less than 2 percent shrinkage in both directions after 30 minutes at 150° C.), such are seen through the lamination processes described below.

The polymeric film may have a hard coat layer on one or both surfaces. Any hard coat formulation known within the art may be utilized. The hard coat may incorporate further additives or be modified to provide other desirable attributes, such as a high scratch-resistance, fog resistance, solvent resistance and moisture barrier properties.

The polymeric film may be a solar control film. The solar control film may reflect infrared light, absorb infrared light or do a combination thereof.

Some embodiments of the laminates of the present invention contain one ore more additional polymeric sheets. Preferably, the additional polymeric sheet is a sheet selected from the group consisting of sheet composed of a poly(vinyl butyral) composition, an acoustic polyvinyl acetal composition, an acoustic polyvinyl butyral composition, an ethylene vinyl acetate composition, an ethylene copolymer composition which incorporates acid functionality and ionomers derived therefrom, a thermoplastic polyurethane composition, polyvinyl chloride copolymer compositions, acoustic compositions, such as the ISD polyacrylate materials and combinations thereof.

Additional specifically preferred embodiments of the present invention include high strength laminates having at least one layer of the sheet of the present invention and at least one layer of a polymeric film; high strength laminates which include at least two layers of the sheet of the present invention and at least one layer of a polymeric film; high strength laminates which include at least one layer of the sheet of the present invention and at least one layer of an additional sheet; and high strength laminates which include at least one layer of the sheet of the present invention, at least one layer of an additional sheet and at least one layer of a polymeric film.

Laminate Formation

The processes to produce the laminates of the present invention may take many forms and may be produced through any known art process. Essentially the layers forming the laminate are placed in contact with each other and sufficient heat and pressure are applied to effect lamination.

Adhesives and primers can be used to enhance the bond strength between the laminate layers. Essentially any adhesive known will find utility within the present invention. Specific examples of the preferable silane adhesives include gamma-chloropropylmethoxysilane, vinyltriethoxysilane, vinyltris(beta-methoxyethoxy)silane, gamma-methacryloxypropylmethoxysilane, vinyltriacetoxysilane, gamma-glycidoxypropyltrimethoxysilane, gamma-glycidoxypropyltriethoxysilane, beta-(3,4-epoxycyclohexyl)ethyltrimethoxysilane, vinyltrichlorosilane, gamma-mercaptopropylmethoxysilane, gamma-aminopropyltriethoxysilane, N-beta-(aminoethyl)-gamma-aminopropyltrimethoxysilane, and mixtures thereof.

The adhesives may be applied through melt processes or through solution, emulsion or dispersion coating processes. One of ordinary skill in the art will be able to identify appropriate process parameters based on the polymeric composition and process used for the coating formation. The laminates of the present invention may also be produced through autoclave and non-autoclave processes, as described below.

Essentially any lamination process known within the art may be used with the interlayers of the present invention. In a typical process, a glass sheet, an interlayer comprised of the polymeric sheet of the present invention, and a second glass sheet are laminated together under heat and pressure and a vacuum (for example, in the range of about 27-28 inches (689-711 mm) Hg) to remove air. Preferably, the interlayer is in contact with the tin side of the glass sheets. Preferably, the glass sheets have been washed and dried. A typical glass type is 90 mil thick annealed flat glass. In a typical procedure, the interlayer of the present invention is positioned between the glass plates to form a glass/interlayer/glass pre-press assembly. The pre-press assembly is placed into a bag capable of sustaining a vacuum ("a vacuum bag"). The pre-press assembly is heated and the air is drawn out of the bag using a vacuum line or other means of pulling a vacuum on the bag. The bag is sealed while maintaining the vacuum. The sealed bag is placed in an autoclave at a temperature of about 120° C. to about 180° C., at a pressure of about 200 psi (14.3 bars), for from about 10 to about 50 minutes. Preferably the bag is autoclaved at a temperature of from about 130° C. to about 160° C. for 20 minutes to about 45 minutes. More preferably the bag is autoclaved at a temperature of about 135° C. for about 30 minutes. The air is then cooled while no more air is added to the autoclave. After about 20 minutes of cooling, when the air temperature is less than 50° C., the excess air pressure is vented and the laminates are removed from the autoclave. One type of vacuum bag is disclosed in U.S. Pat. No. 3,311,517. A vacuum ring may be substituted for the vacuum bag.

Alternatively, the glass/interlayer/glass pre-press assembly can be heated in an oven at between about 80 and about 120° C., preferably between about 90 and about 100° C., for about 30 minutes. Thereafter, the heated glass/interlayer/glass pre-press assembly is passed through a set of nip rolls so that air in the void spaces between the glass and the interlayer is squeezed out, and the edge of the pre-press assembly is sealed. The pre-press assembly may then be placed in an air autoclave and processed as described above. Essentially any lamination process known within the art may be used with the interlayers of the present invention.

The laminates of the present invention may also be produced using non-autoclave processes. Such non-autoclave processes are disclosed, for example, in U.S. Pat. No. 3,234,062, U.S. Pat. No. 3,852,136, U.S. Pat. No. 4,341,576, U.S. Pat. No. 4,385,951, U.S. Pat. No. 4,398,979, U.S. Pat. No. 5,536,347, U.S. Pat. No. 5,853,516, U.S. Pat. No. 6,342,116, U.S. Pat. No. 5,415,909, US 2004/0182493, EP 1 235 683 B1, WO 91/01880 and WO 03/057478 A1.

The lamination processes may be utilized to form a wide variety of laminate structures of the present invention. As described above, adhesives, primers, and "additional layers" of polymeric sheets and films rigid sheets may be incorporated into the laminates of the present invention.

Abrasion resistant hard coats may be applied to the laminate. The hard coats help to protect the outer polymeric layers from scratching, abrasion, and the like. Hard coat compositions are common within the art. As an example see U.S. Pat. No. 4,027,073.

For architectural uses and for uses in transportation such as automobiles, trucks, and trains, a typical laminate of the present invention has a layer of glass and directly self-adhered to the glass is an interlayer of the present invention. The laminate has an overall thickness of about 3 mm to about 30 mm. The interlayer typically has a thickness of about 0.38 mm to about 4.6 mm and each glass layer usually is at least 1 mm thick or thicker. The interlayer of the present invention is adhered directly to the glass and an intermediate adhesive layer or coating between the glass and the interlayer is not required. Similarly, multilayer structured laminates may be formed.

Additives

It is understood that the compositions of the sheets and laminates of the present invention may be used with additives known within the art. The additives include plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, and primers. For example, typical colorants may include a bluing agent to reduce yellowing, a colorant may be added to color the laminate or control solar light, such as in the case of an inorganic or organic infrared absorber.

If higher levels of adhesion are desired within the laminates of the present invention, silane coupling agents may be incorporated into the films and sheets of the present invention. Specific examples of the useful silane coupling agents include; gamma-chloropropylmethoxysilane, vinyltrichlorosilane, vinyltriethoxysilane, vinyltris(beta-methoxyethoxy)silane, gamma-methacryloxypropyltrimethoxysilane, beta-(3,4-epoxycyclohexyl)ethyltrimethoxysilane, gammaglycidoxypropyltrimethoxysilane, vinyl-triacetoxysilane, gamma-mercaptopropyltrimethoxysilane, gamma-aminopropyltriethoxysilane, N-beta-(aminoethyl)-gamma-aminopropyl-trimethoxysilane, and combinations thereof. Typically, said silane coupling agents are added at a level of about 0.01 to about 5 weight percent based on the total weight of the composition.

The compositions of the present invention may incorporate an effective amount of a thermal stabilizer. Essentially any thermal stabilizer known within the art will find utility within the present invention. Preferable general classes of thermal stabilizers include phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds which destroy peroxide, hydroxylamines, nitrones, thiosynergists, benzofuranones, indolinones, and the like and mixtures thereof. The compositions of the present invention preferably incorporate from about 0 to about 10 weight percent thermal stabilizers, based on the total weight of the composition. More preferably, the compositions of the present invention incorporate from about 0 to about 5 weight percent thermal stabilizers, based on the total weight of the composition. Most preferably, the compositions of the present invention incorporate from about 0 to about 1 weight percent thermal stabilizers, based on the total weight of the composition.

The compositions of the present invention may incorporate an effective amount of UV absorbers. Essentially any UV absorber known within the art will find utility within the present invention. Preferable general classes of UV absorbers include benzotriazoles, hydroxybenzophenones, hydroxyphenyl triazines, esters of substituted and unsubstituted benzoic acids, and mixtures thereof. The compositions of the present invention preferably incorporate from about 0 to about 10 weight percent UV absorbers, based on the total weight of the composition. More preferably, the compositions of the present invention incorporate from about 0 to about 5 weight percent UV absorbers, based on the total weight of the composition. Most preferably, the compositions of the present invention incorporate from about 0 to about 1 weight percent UV absorbers, based on the total weight of the composition.

The compositions of the present invention may incorporate an effective amount of hindered amine light stabilizers (HALS). Hindered amine light stabilizers (HALS) are generally well disclosed within the art. Essentially any hindered amine light stabilizer known within the art may find utility within the present invention. Generally, hindered amine light stabilizers are disclosed to be secondary, tertiary, acetylated, N-hydrocarbyloxy substituted, hydroxy substituted N-hydrocarbyloxy substituted, or other substituted cyclic amines which further incorporate steric hindrance, generally derived from aliphatic substitution on the carbon atoms adjacent to the amine function. The compositions of the present invention preferably incorporate from about 0 to about 10 weight percent hindered amine light stabilizers, based on the total weight of the composition. More preferably, the compositions of the present invention incorporate from about 0 to about 5 weight percent hindered amine light stabilizers, based on the total weight of the composition. Most preferably, the compositions of the present invention incorporate from about 0 to about 1 weight percent hindered amine light stabilizers, based on the total weight of the composition.

The ethylene copolymer compositions of the present invention may further incorporate additives which effectively reduce the melt flow of the resin, to the limit of producing thermoset films and sheets. The use of such additives will enhance the upper end use temperature of the film, sheet, and laminates of the present invention. Typically, the end use temperature will be enhanced up to 20 to 70° C. In addition, laminates produced from such materials will be fire resistant. By reducing the melt flow of the ethylene copolymer interlayer of the present invention, said material will have a reduced tendency to melt and flow out of the laminate and, in turn, serve as additional fuel for a fire. Specific examples of melt flow reducing additives are organic peroxides. Preferably the organic peroxide decomposes at a temperature of about 100° C. or higher to generate radicals. More preferably, the organic peroxides have a decomposition temperature which affords a half life of 10 hours at about 70° C. or higher to provide improved stability for blending operations. Typically, the organic peroxides will be added at a level of between about 0.01 to about 10 weight percent based on the total weight of the ethylene copolymer composition. If desired, initiators, such as dibutyltin dilaurate, may be used. Typically, initiators are added at a level of from about 0.01 weight percent to about 0.05 weight percent based on the total weight of the ethylene copolymer composition. If desired, inhibitors, such as hydroquinone, hydroquinone monomethyl ether, p-benzoquinone, and methylhydroquinone, may be added to enhance control of the reaction and stability. Typically, the inhibitors would be added at a level of less than about 5 weight percent based on the total weight of the ethylene copolymer composition.

Polymeric Sheet Formation

Polymeric sheets may be formed by any process known in the art, such as extrusion, calendering, solution casting or injection molding. The parameters for each of these processes can be easily determined by one of ordinary skill in the art depending upon viscosity characteristics of the polymeric material and the desired thickness of the sheet.

The polymeric sheet of the present invention is preferably formed by extrusion. Extrusion is particularly preferred for formation of "endless" products, such as films and sheets, which emerge as a continuous length. In extrusion, the polymeric material, whether provided as a molten polymer or as plastic pellets or granules, is fluidized and homogenized. Additives, as described above, such as thermal or UV stabilizers, plasticizers, fillers and/or blendable polymeric materials, may be added, if desired. Preferably, the melt processing temperature of the polymeric compositions of the present invention is from about 100° C. to about 300° C. More preferably, the melt processing temperature of the polymeric compositions of the present invention is from about 150° C. to about 250° C. The polymeric compositions of the present invention have excellent thermal stability, which enables processing at high enough temperatures to reduce the effective melt viscosity. Recycled polymeric compositions of the present invention can be used along with the virgin polymeric compositions of the present invention. This mixture is then forced through a suitably shaped die to produce the desired cross-sectional polymeric sheet shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders may be used as known in the art. Different kinds of die are used to produce different products, such as sheets and strips (slot dies) and hollow and solid sections (circular dies). In this manner, sheets of different widths and thickness are produced. After extrusion, the polymeric sheet is taken up on rollers or as flat sheets, cooled and taken off by means of suitable devices which are designed to prevent any subsequent deformation of the sheet.

Using extruders as known in the art, a sheet can be produced by extruding a layer of polymer over chilled rolls and then further drawing down the sheet to the desired size by tension rolls. In the extrusion casting process, the polymer melt is conveyed from the extruder through a slot die (T-shaped or "coat hanger" die). The die may be as wide as 10 feet and typically have thick wall sections on the final lands to minimize deflection of the lips from internal pressure. Die openings may be within a wide range. The nascent cast sheet may be drawn down, and thinned significantly, depending on the speed of the rolls taking up the sheet. The sheet is then solidified by cooling below the crystalline melting point or glass transition temperature. This may be accomplished by passing the sheet through a water bath or over two or more chrome-plated chill rolls which have been cored for water cooling. The cast sheet is then conveyed though nip rolls, a slitter to trim the edges, and then wound up or cut and stacked. In cast sheet, conditions may be tailored to allow a relatively high degree of orientation in the machine direction, especially at high draw down conditions and wind up speeds, and a much lower level of orientation in the transverse direction. Alternatively, the conditions may be tailored to minimize the level of orientation, thus providing sheets with essentially equivalent physical properties in both the machine direction and the transverse direction.

For manufacturing large quantities of sheets, a sheeting calender is employed. The rough sheet is fed into the gap of the calender, a machine comprising a number of heatable parallel cylindrical rollers which rotate in opposite directions and spread out the polymer and stretch it to the required thickness. The last roller smooths the sheet thus produced. If the sheet is required to have a textured surface, the final roller is provided with an appropriate embossing pattern. Alternatively, the sheet may be reheated and then passed through an embossing calender. The calender is followed by one or more cooling drums. Finally, the finished sheet is reeled up or cut into lengths and stacked.

The polymeric sheet of the present invention may have a smooth surface. Preferably, the polymeric sheet to be used as an interlayer within laminates has a roughened surface to effectively allow most of the air to be removed from between the surfaces of the laminate during the lamination process. This can be accomplished, for example, by mechanically embossing the sheet after extrusion, as described above, or by melt fracture during extrusion of the sheet. For example, the as extruded sheet may be passed over a specially prepared surface of a die roll positioned in close proximity to the exit of the die which imparts the desired surface characteristics to one side of the molten polymer. Thus, when the surface of such roll has minute peaks and valleys, sheet formed of polymer cast thereon will have a rough surface on the side which contacts the roll. The rough surface generally conforms to the valleys and peaks of the roll surface. Such die rolls are disclosed in, for example, U.S. Pat. No. 4,035,549. As is known, this rough surface is only temporary and particularly functions to facilitate deairing during laminating after which it is melted smooth from the elevated temperature and pressure associated with autoclaving and other lamination processes.

The above extrusion process can be combined with a variety of post-extruding operations for expanded versatility. Such post-forming operations include altering round to oval shapes, stretching the sheet to different dimensions, machining and punching, biaxial stretching and the like, as known to those skilled in the art.

The polymeric sheet of the invention may be combined with other polymeric materials during extrusion and/or finishing to form laminates or multilayer sheets with improved characteristics. A multilayer or laminate sheet may be made by any method known in the art, and may have as many as five or more separate layers joined together by heat, adhesive and/or tie layer, as known in the art. One advantage to multilayer sheets is that specific properties can be tailored into the sheet to solve critical use needs while allowing the more costly ingredients to be relegated to the outer layers where they provide the greater needs. The multilayer sheet structures can be formed through coextrusion, blown film, dipcoating, solution coating, blade, puddle, air-knife, printing, Dahigren, gravure, powder coating, spraying, or other art processes. Generally, the multilayer sheets are produced through coextrusion casting processes. For example, the resin materials are heated in a uniform manner. The molten materials are conveyed to a coextrusion adapter that combines the molten materials to form a multilayer coextuded structure. The layered polymeric material is transferred through an extrusion die opened to a predetermined gap. The material is then drawn down to the intended gauge thickness by means of a primary chill or casting roll maintained at typically in the range of about 15 to about 55° C. (60-130° F.). Typical draw down ratios range from about 1:1 to about 5:1 to about 40:1. The additional layers may serve as barrier layers, adhesive layers, antiblocking layers, solar control layers or for other purposes.

One of ordinary skill in the art will be able to identify appropriate process parameters based on the polymeric composition and process used for sheet formation.

Shrinkage can be controlled as described for the polymeric film, i.e., by holding the polymeric sheet in a stretched position and heating for a few seconds before quenching. Further, the sheet may also be subjected to rolling, calendering, coating, embossing, printing, or any other typical finishing operations known within the art.

The properties exhibited by a sheet will depend on several factors indicated above, including the polymeric composition, the method of forming the polymer, the method of forming the sheet, and whether the sheet was treated for stretch or biaxially oriented. These factors affect many properties of the sheet, such as shrinkage, tensile strength, elongation at break, impact strength, dielectric strength and constant, tensile modulus, chemical resistance, melting point, heat deflection temperature, and the like.

The sheet properties may be further adjusted by adding certain additives and fillers to the polymeric composition such as colorants, dyes, plasticizers, lubricants, antiblock agents, slip agents, UV and thermal stabilizers, and antioxidants as recited above for films. Sheets of the present invention may be treated by radiation, for example E-beam treatment of the sheets, as discussed for films.

The following examples are presented to more fully demonstrate and further illustrate various aspects of the invention and are not meant to be unduly limiting.

EXAMPLES

Analytical Methods

Haze is the percentage of luminous flux that is scattered at an angle of more than 2.5 degrees from the axis defined by the path of unscattered light traveling through the laminate. Haze was measured using a Hazegard hazemeter (BYK-Gardner USA, Columbia, Md.) according to ASTM standard NF-54-111, which is in agreement with method A of ASTM standard D1003-61. Haze was measured on the left side of the sheet, the middle of the sheet and the right side of the sheet and these measurements were averaged to provide the average haze at each sheet thickness. For the 90 mil (2.29 mm) thick haze measurements, three 30 mil (0.75 mm) thick sheets were stacked on top of each other.

Compressive Shear Strength was determined through the method disclosed in U.S. Pat. No. 6,599,630 as outlined here. Six 1" by 1" (25 mm by 25 mm) chips were sawed from the laminate. The chips were conditioned in a room controlled at 23° C.±2° C. and 50 percent ±1 percent relative humidity for one hour prior to testing. A chip was placed on the cut-out on the lower half of the jig shown in FIG. 1 of U.S. Pat. No. 6,599,630, and the upper half of the jig was then placed on top of the chip. A cross-head was lowered at the rate of 0.1 inch per minute (2.5 mm per minute) until it contacted the upper piece of the device. As the cross-head continues to travel downward, one piece of glass of the chip begins to slides relative to the other. The compressive shear strength of the chip is the shear stress required to cause adhesive failure. The result reported is the average of the measurements for the six chips. The precision of this test is such that one standard deviation is typically 6 percent of the average result of six chips.

Peel testing was performed through the 90 degree peel strength adhesion test method. The laminates were peeled at a 90-degree angle using a Model SP-102B-3M90 SLIP/PEEL Tester (Instrumentors, Inc., Strongsville, Ohio 44149). The laminates were peeled at rates of 1 inch (2.5 cm) and 2 inches (5.1 cm) per minute.

Standard Lamination Procedure

A pre-press assembly, in which all the layers in the laminate were cut to the same size and stacked in the desired order, was placed into a vacuum bag and heated at 90 to 100° C. for 30 minutes to remove any air contained between the layers of the pre-press assembly. The pre-press assembly is heated at 135° C. for 30 minutes in an air autoclave at a pressure of 200 psig (14.3 bar). The air was then cooled without adding additional gas, so that the pressure in the autoclave is allowed to decrease. After 20 minutes of cooling, when the air temperature was less than about 50° C., the excess pressure was vented, and the laminate was removed from the autoclave.

Comparative Experiment A

A copoly(ethylene-co-methacrylic acid) incorporating 19 weight percent methacrylic acid that was neutralized to a level of 37.4 percent with sodium (Ionomer Resin A) was extrusion cast into sheet in the following manner. The copolymer was fed into a 1.5-inch (38 mm) diameter Killion extruder (Davis-Standard Killion, Pawcatuck, Conn., USA 06379) with a temperature profile:

| Extruder Zone | Temperature (° C.) |
| --- | --- |
| Feed | Ambient |
| Zone 1 | 130 |
| Zone 2 | 150 |
| Zone 3 | 190 |
| Block | 210 |
| Die | 210 |

Polymer throughput was controlled by adjusting the screw speed to 70 rpm. The extruder fed a 14-inch (35.6 cm) "coat hanger" die with a nominal gap of 0.038 inch (0.97 mm). The as cast sheet was fed into a three roll stack consisting of a 6-inch (15.2 cm) diameter rubber nip roll covered with a Teflon® release film and two 12-inch (30.5 cm) diameter polished chrome chill rolls held at a temperature of about 15° C. The nominally 0.030-inch (30 mils, 0.75 mm) thick sheet was then wound onto cardboard cores at a rate of about 2.8 feet/minute (0.85 m/minute).

The average haze for a 30 mil (0.75 mm) thickness was 0.65 and the average haze for a 90 mil (2.29 mm) thickness was 1.7.

Comparative Experiment B

A copoly(ethylene-co-methacrylic acid) incorporating 19 weight percent methacrylic acid that was neutralized to a level of 48.5 percent with zinc (Ionomer Resin B) was extrusion cast into sheet essentially as described in Comparative Experiment A to produce nominally 0.030-inch thick sheet (30 mils, 0.75 mm).

The average haze for a 30 mil (0.75 mm) thickness was 1.33 and the average haze for a 90 mil (2.29 mm) thickness was 3.87.

Comparative Experiment C

A blend composition consisting of 75 weight percent of Ionomer Resin A and 25 weight percent of Ionomer Resin B, based on the total weight of the final blend, was dry blended and then compounded on a 1 inch Killion single screw extruder.

The extruder had a melt temperature of approximately 200° C. and a rate of 2.5 pounds per hour. The screw speed ranged from 47 to 70 RPM and the rear zone temperature ranged from 120° C. to 170° C., depending on the composition. The adapter pressure ranged from 400 psi to 800 psi and power consumption ranged from about 2.5 to 3 amps. The typical extruder barrel temperature profile was as follows:

| | |
|---|---|
| Rear (Feed Hopper) Zone: | 120 to 170° C. |
| Mid Zone: | 199 to 203° C. |
| Front Zone: | 200 to 202° C. |
| Adapter: | 200 to 201° C. |

A single strand was passed through a water bath and pelletized to form small pellets. The pellets were purged with nitrogen overnight at room temperature and then sealed in a moisture barrier package.

The blend was extrusion cast into sheet as described in Comparative Experiment A to produce nominally 0.030-inch thick sheet (30 mils, 0.75 mm). The polymeric sheet was an ionomer blend neutralized to a level of 40% comprising 70% sodium ions and 30% zinc ions, based on the total neutralization amount.

Example 1

A blend composition consisting of 50 weight percent of Ionomer Resin A and 50 weight percent of Ionomer Resin B, based on the total weight of the final blend, was dry blended and then compounded on an 1 inch Killion single screw extruder, as described in Comparative Experiment C.

The blend was extrusion cast into sheet as described in Comparative Experiment A to produce nominally 0.030-inch thick sheet (30 mils, 0.75 mm). The polymeric sheet was an ionomer blend neutralized to a level of 43% comprising 44% sodium ions and 56% zinc ions, based on the total neutralization amount.

The average haze for a 30 mil (0.75 mm) thickness was 0.56 and the average haze for a 90 mil (2.29 mm) thickness was 1.14.

Example 2

A blend composition consisting of 25 weight percent of Ionomer Resin A and 75 weight percent of Ionomer Resin B based on the total weight of the final blend, was dry blended and then compounded on an 1 inch Killion single screw extruder, as described in Comparative Experiment C.

The blend was extrusion cast into sheet as described in Comparative Experiment A to produce nominally 0.030-inch thick sheet (30 mils, 0.75 mm). The polymeric sheet was an ionomer blend neutralized to a level of 48% comprising 20% sodium ions and 80% zinc ions, based on the total neutralization amount.

The average haze for a 30 mil (0.75 mm) thickness was 0.83 and the average haze for a 90 mil (2.29 mm) thickness was 2.71.

Comparative Experiment 1-A

A glass laminate consisting of a glass layer, the polymeric sheet produced in Comparative Experiment A, and a glass layer was produced in the following manner. The sheet from Comparative Experiment A was not conditioned and was used "as received". The glass/polymeric sheet/glass pre-press assembly consisting of, in order, a clear annealed float glass plate layer, the polymeric sheet produced in Comparative Experiment A with the tin side of the glass layer in contact with the polymeric sheet, and a clear annealed float glass plate layer with the tin side of the glass in contact with the polymeric sheet (each layer measuring 6 inches by 6 inches (152 mm by 152 mm); glass layers 2.5 mm thick; polymeric sheet 30 mils (0.75 mm) thick) was laminated according to the standard lamination procedure.

The compressive shear strength of the laminate was 5635 psi.

Comparative Experiment 1-B

A glass laminate consisting of a glass layer, the polymeric sheet produced in Comparative Experiment B, and a glass layer were produced using the method described in Comparative Experiment 1-A, with the only difference being that the polymeric sheet used was the polymeric sheet produced in Comparative Experiment B.

The compressive shear strength of the laminate was 6254 psi.

Comparative Experiment 1-C

A glass laminate consisting of a glass layer, the polymeric sheet produced in Comparative Experiment C, and a glass layer were produced using the method described in Comparative Experiment 1-A, with the only difference being that the polymeric sheet used was the polymeric sheet produced in Comparative Experiment C.

The compressive shear strength of the laminate was 6040 psi.

Example 1-1

A glass laminate consisting of a glass layer, the polymeric sheet produced in Example 1, and a glass layer were produced using the method described in Comparative Experiment 1-A, with the only difference being that the polymeric sheet used was the polymeric sheet produced in Example 1.

The compressive shear strength of the laminate was 6380 psi.

Example 1-2

A glass laminate consisting of a glass layer, the polymeric sheet produced in Example 2, and a glass layer were produced using the method described in Comparative Experiment 1-A, with the only difference being that the polymeric sheet used was the polymeric sheet produced in Example 2.

The compressive shear strength of the laminate was 6603 psi.

Comparative Experiment 2-A

Laminates consisting of a glass layer and the polymeric sheet produced in Comparative Experiment A were produced in the following manner. The sheet from Comparative Experiment A was not conditioned and was used "as received". A glass/polymeric sheet/Teflon® film/glass pre-press assembly consisting of, in order, a clear annealed float glass plate layer, the polymeric sheet produced in Comparative Experiment A with the tin side of the glass layer in contact with the polymeric sheet, a thin Teflon® film layer and a clear annealed float glass plate layer (each layer measuring 7 inches by 3.5 inches (178 mm by 89 mm); glass layers 2.5 mm thick; polymeric sheet 30 mils (0.75 mm) thick) was laminated according to the standard lamination procedure. Removal of the Teflon® film and the glass cover sheet provided the desired glass/polymeric sheet laminate.

The laminates were found to have a peel adhesion of 4.1 lb/in.

Comparative Experiment 2-B

Laminates consisting of a glass layer and the polymeric sheet produced in Comparative Experiment B were produced using the method described in Comparative Experiment 2-A, with the only difference being that the polymeric sheet used was the polymeric sheet produced in Comparative Experiment B.

The laminates had a peel adhesion of 8.8 lb/in.

Comparative Experiment 2-C

Laminates consisting of a glass layer and the polymeric sheet produced in Comparative Experiment C were produced using the method described in Comparative Experiment 2-A, with the only difference being that the polymeric sheet used was the polymeric sheet produced in Comparative Experiment B.

The laminates had a peel adhesion of 8.5 lb/in.

Example 2-1

Laminates consisting of a glass layer and the polymeric sheet produced in Example 1 were produced using the method described in Comparative Experiment 2-A, with the only difference being that the polymeric sheet used was the polymeric sheet produced in Example 1.

The laminates had a peel adhesion of 10.1 lb/in.

Example 2-2

Laminates consisting of a glass layer and the polymeric sheet produced in Example 2 were produced using the method described in Comparative Experiment 2-A, with the only difference being that the polymeric sheet used was the polymeric sheet produced in Example 2.

The laminates had a peel adhesion of 8.8 lb/in.

Comparative Experiment 3-A

Laminates consisting of a glass layer and the polymeric sheet produced in Comparative Experiment A were produced using the method described in Comparative Experiment 2-A, with the only difference being that the air side of the glass layer rather than the tin side was in contact with the polymeric sheet.

The laminates had a peel adhesion of 4 lb/in.

Comparative Experiment 3-B

Laminates consisting of a glass layer and the polymeric sheet produced in Comparative Experiment B were produced using the method described in Comparative Experiment 3-A, with the only difference being that the polymeric sheet used was the polymeric sheet produced in Comparative Experiment B.

The laminates had a peel adhesion of 6.7 lb/in.

Comparative Experiment 3-C

Laminates consisting of a glass layer and the polymeric sheet produced in Comparative Experiment C were produced using the method described in Comparative Experiment 3-A, with the only difference being that the polymeric sheet used was the polymeric sheet produced in Comparative Experiment C.

The laminates had a peel adhesion of 4.5 lb/in.

Example 3-1

Laminates consisting of a glass layer and the polymeric sheet produced in Example 1 were produced using the method described in Comparative Experiment 3-A, with the only difference being that the polymeric sheet used was the polymeric sheet produced in Example 1.

The laminates had a peel adhesion of 7.4 lb/in.

Example 3-2

Laminates consisting of a glass layer and the polymeric sheet produced in Example 2 were produced using the method described in Comparative Experiment 3-A, with the only difference being that the polymeric sheet used was the polymeric sheet produced in Example 2.

The laminates had a peel adhesion of 7.6 lb/in.

Comparative Experiment 4-A

Laminates consisting of a glass layer and the polymeric sheet produced in Comparative Experiment A were produced using the method described in Comparative Experiment 2-A, with the only difference being that the polymeric sheet from Comparative Experiment A was conditioned at less than 8 percent relative humidity (RH) at a temperature of 72° F. overnight before being used in the pre-press assembly.

The laminates had a peel adhesion of 2.2 lb/in.

Comparative Experiment 4-B

Laminates consisting of a glass layer and the polymeric sheet produced in Comparative Experiment B were produced using the method described in Comparative Experiment 4-A, with the only difference being that the polymeric sheet used was the polymeric sheet produced in Comparative Experiment B.

The laminates had a peel adhesion of 15.6 lb/in.

Comparative Experiment 4-C

Laminates consisting of a glass layer and the polymeric sheet produced in Comparative Experiment C were produced using the method described in Comparative Experiment 4-A, with the only difference being that the polymeric sheet used was the polymeric sheet produced in Comparative Experiment C.

The laminates were found to have a peel adhesion of 5 lb/in.

Example 4-1

Laminates consisting of a glass layer and the polymeric sheet produced in Example 1 were produced using the method described in Comparative Experiment 4-A, with the only difference being that the polymeric sheet used was the polymeric sheet produced in Example 1.

The laminates were found to have a peel adhesion of 8.8 lb/in.

Example 4-2

Laminates consisting of a glass layer and the polymeric sheet produced in Example 2 were produced using the method described in Comparative Experiment 4-A, with the only difference being that the polymeric sheet used was the polymeric sheet produced in Example 2.

The laminates were found to have a peel adhesion of 8.6 lb/in.

Comparative Experiment 5-A

Laminates consisting of a glass layer and the polymeric sheet produced in Comparative Experiment A were produced using the method described in Comparative Experiment 4-A, with the only difference being that the air side of the glass layer rather than the tin side was in contact with the polymeric sheet.

The laminates were found to have a peel adhesion of 1.6 lb/in.

Comparative Experiment 5-C

Laminates consisting of a glass layer and the polymeric sheet produced in Comparative Experiment C were produced using the method described in Comparative Experiment 5-A, with the only difference being that the polymeric sheet used was the polymeric sheet produced in Comparative Experiment C.

The laminates were found to have a peel adhesion of 3.6 lb/in.

Example 5-1

Laminates consisting of a glass layer and the polymeric sheet produced in Example 1 were produced using the method described in Comparative Experiment 5-A, with the only difference being that the polymeric sheet used was the polymeric sheet produced in Example 1.

The laminates were found to have a peel adhesion of 5.2 lb/in.

Example 5-2

Laminates consisting of a glass layer and the polymeric sheet produced in Example 2 were produced using the method described in Comparative Experiment 5-A, with the only difference being that the polymeric sheet used was the polymeric sheet produced in Example 2.

The laminates were found to have a peel adhesion of 5.9 lb/in.

Comparative Experiment 6-A

Laminates consisting of a glass layer and the polymeric sheet produced in Comparative Experiment A were produced using the method described in Comparative Experiment 2-A, with the only difference being that the polymeric sheet from Comparative Experiment A was conditioned at 23 percent relative humidity (RH) at a temperature of 72° F. overnight before being used in the pre-press assembly.

The laminates were found to have a peel adhesion of 0.8 lb/in.

Comparative Experiment 6-C

Laminates consisting of a glass layer and the polymeric sheet produced in Comparative Experiment C were produced using the method described in Comparative Experiment 6-A, with the only difference being that the polymeric sheet used was the polymeric sheet produced in Comparative Experiment C.

The laminates were found to have a peel adhesion of 2 lb/in.

Example 6-1

Laminates consisting of a glass layer and the polymeric sheet produced in Example 1 were produced using the method described in Comparative Experiment 6-A, with the only difference being that the polymeric sheet used was the polymeric sheet produced in Example 1.

The laminates were found to have a peel adhesion of 4.9 lb/in.

Example 6-2

Laminates consisting of a glass layer and the polymeric sheet produced in Example 2 were produced using the method described in Comparative Experiment 6-A, with the only difference being that the polymeric sheet used was the polymeric sheet produced in Example 2.

The laminates were found to have a peel adhesion of 9.6 lb/in.

Comparative Experiment 7-A

Laminates consisting of a glass layer and the polymeric sheet produced in Comparative Experiment A were produced using the method described in Comparative Experiment 2-A, with the only difference being that the polymeric sheet from Comparative Experiment A was conditioned at 50 percent relative humidity (RH) at a temperature of 72° F. overnight before being used in the pre-press assembly.

The laminates were found to have a peel adhesion of 1.2 lb/in.

Comparative Experiment 7-B

Laminates consisting of a glass layer and the polymeric sheet produced in Comparative Experiment B were produced using the method described in Comparative Experiment 7-A, with the only difference being that the polymeric sheet used was the polymeric sheet produced in Comparative Experiment B.

The laminates were found to have a peel adhesion of 10.6 lb/in.

Comparative Experiment 7-C

Laminates consisting of a glass layer and the polymeric sheet produced in Comparative Experiment C were produced using the method described in Comparative Experiment 7-A, with the only difference being that the polymeric sheet used was the polymeric sheet produced in Comparative Experiment C.

The laminates were found to have a peel adhesion of 1.1 lb/in.

Example 7-1

Laminates consisting of a glass layer and the polymeric sheet produced in Example 1 were produced using the method described in Comparative Experiment 7-A, with the only difference being that the polymeric sheet used was the polymeric sheet produced in Example 1.

The laminates were found to have a peel adhesion of 3.9 lb/in.

Example 7-2

Laminates consisting of a glass layer and the polymeric sheet produced in Example 2 were produced using the method described in Comparative Experiment 7-A, with the only difference being that the polymeric sheet used was the polymeric sheet produced in Example 2.

The laminates were found to have a peel adhesion of 14.8 lb/in.

Comparative Experiment 8-A

Laminates consisting of a glass layer and the polymeric sheet produced in Comparative Experiment A were produced using the method described in Comparative Experiment 7-A, with the only difference being that the air side of the glass layer rather than the tin side was in contact with the polymeric sheet.

The laminates were found to have a peel adhesion of <1 lb/in.

Comparative Experiment 8-C

Laminates consisting of a glass layer and the polymeric sheet produced in Comparative Experiment C were produced using the method described in Comparative Experiment 8-A, with the only difference being that the polymeric sheet used was the polymeric sheet produced in Comparative Experiment C.

The laminates were found to have a peel adhesion of 0.5 lb/in.

Example 8-1

Laminates consisting of a glass layer and the polymeric sheet produced in Example 1 were produced using the method described in Comparative Experiment 8-A, with the only difference being that the polymeric sheet used was the polymeric sheet produced in Example 1.

The laminates were found to have a peel adhesion of 2.4 lb/in.

Example 8-2

Laminates consisting of a glass layer and the polymeric sheet produced in Example 2 were produced using the method described in Comparative Experiment 8-A, with the only difference being that the polymeric sheet used was the polymeric sheet produced in Example 2.

The laminates were found to have a peel adhesion of 4.2 lb/in.

What is claimed is:

1. A polymeric sheet having a thickness of about 10 mils to about 120 mils and having at least one layer consisting essentially of an ionomer or ionomer blend, wherein said ionomer is a copolymer of ethylene and about 10 to about 30 weight percent alpha, beta-ethylenically unsaturated carboxylic acid selected from the group consisting of acrylic acid, methacrylic acid and mixtures thereof, wherein said ionomeric blend is a blend of copolymers of ethylene and about 10 to about 30 weight percent alpha, beta-ethylenically unsaturated carboxylic acid selected from the group consisting of acrylic acid, methacrylic acid and mixtures thereof, wherein said ionomer or ionomer blend is neutralized with sodium in an amount ranging from about 15 to about 50% and zinc in an amount ranging from about 50 to about 85%, wherein the percentages are based on the total amount of neutralization of the alpha, beta-ethylenically unsaturated carboxylic acid, and wherein the total amount of neutralization of the alpha, beta-ethylenically unsaturated carboxylic acid is about 43 to about 50%.

2. The polymeric sheet of claim 1, wherein the sheet is transparent.

3. A laminated article prepared from:
   (a) a polymeric sheet as claimed in claim 1; and
   (b) at least one additional layer selected from the group consisting of rigid sheets, polymeric sheets, polymeric films and combinations thereof.

4. A laminated article prepared from:
   (a) a polymeric sheet as claimed in claim 1; and
   (b) a rigid sheet laminated to said polymeric sheet, wherein said rigid sheet is selected from the group consisting of glass, polycarbonate, poly(meth)acrylate, cyclic polyolefins, polystyrene and combinations thereof.

5. The polymeric sheet of claim 1, wherein the polymeric sheet has a thickness of 15 to 120 mils.

6. The laminated article of claim 4, further comprising an additional rigid sheet laminated to the other surface of said polymeric sheet, wherein said additional rigid sheet is selected from the group consisting of: glass, polycarbonate, poly(meth)acrylate, cyclic polyolefins, polystyrene and combinations thereof.

7. The laminated article of claim 4 wherein the article is transparent.

8. The laminated article of claim 4, wherein the laminated article is transparent and wherein the polymeric sheet has a thickness of 15 to 120 mils.

9. The laminated article of claim 6, wherein the rigid sheets comprise glass.

10. The laminated article of claim 9, wherein the laminated article is transparent and wherein the polymeric sheet has a thickness of 30 to 90 mils.

11. The polymeric sheet of claim 5, wherein the polymeric sheet has a thickness of 30 to 90 mils.

* * * * *